Figure 1:
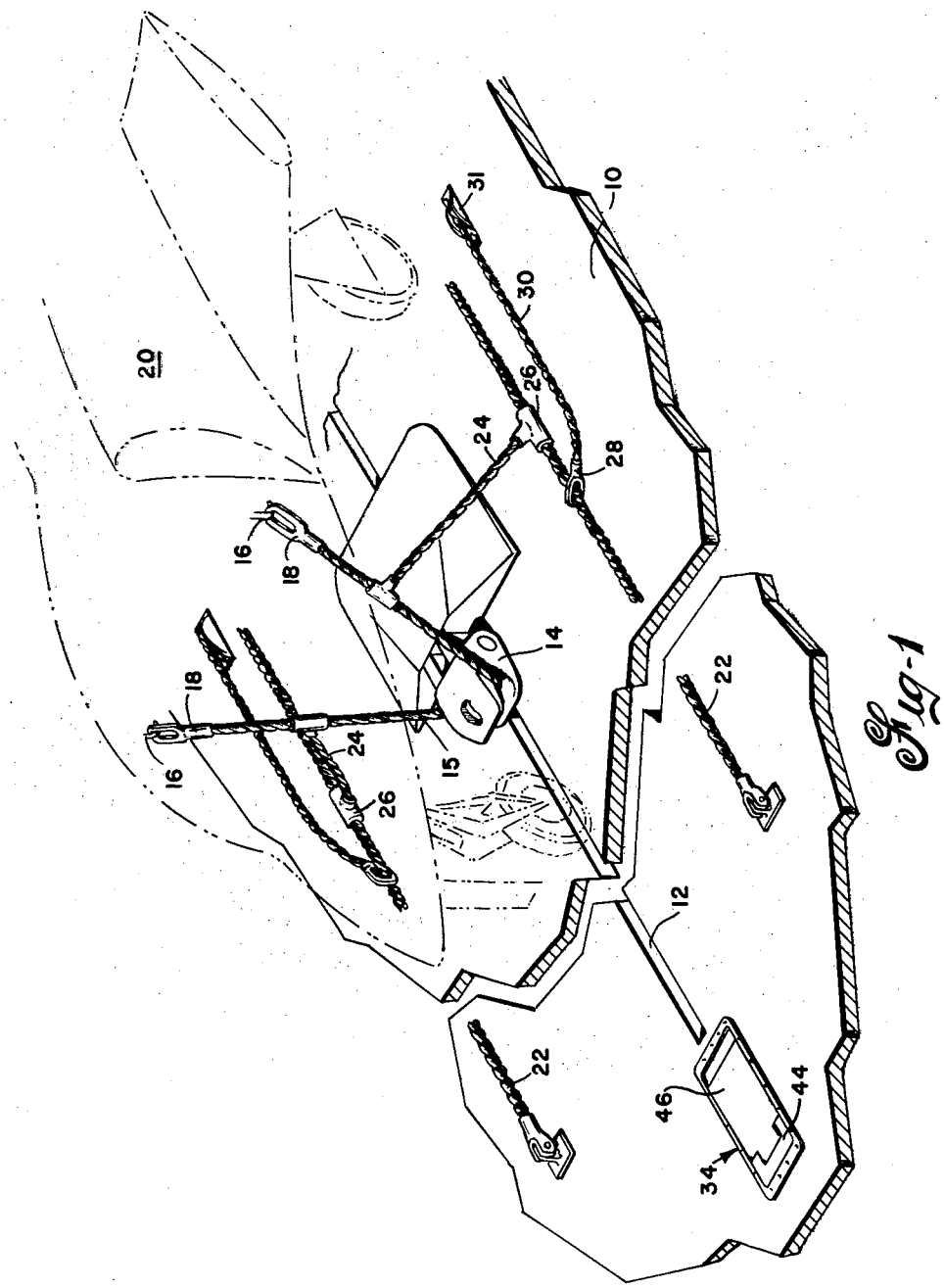

Aug. 25, 1964　　　E. A. AMBROSANO, SR　　　3,145,952
BRIDLE AND PENDANT ARRESTMENT DEFLECTOR
Filed June 7, 1963　　　　　　　　　　　　　　　2 Sheets-Sheet 1

INVENTOR.
EDWARD A. AMBROSANO Sr.
BY
　Arthur L. Collins
ATTORNEY

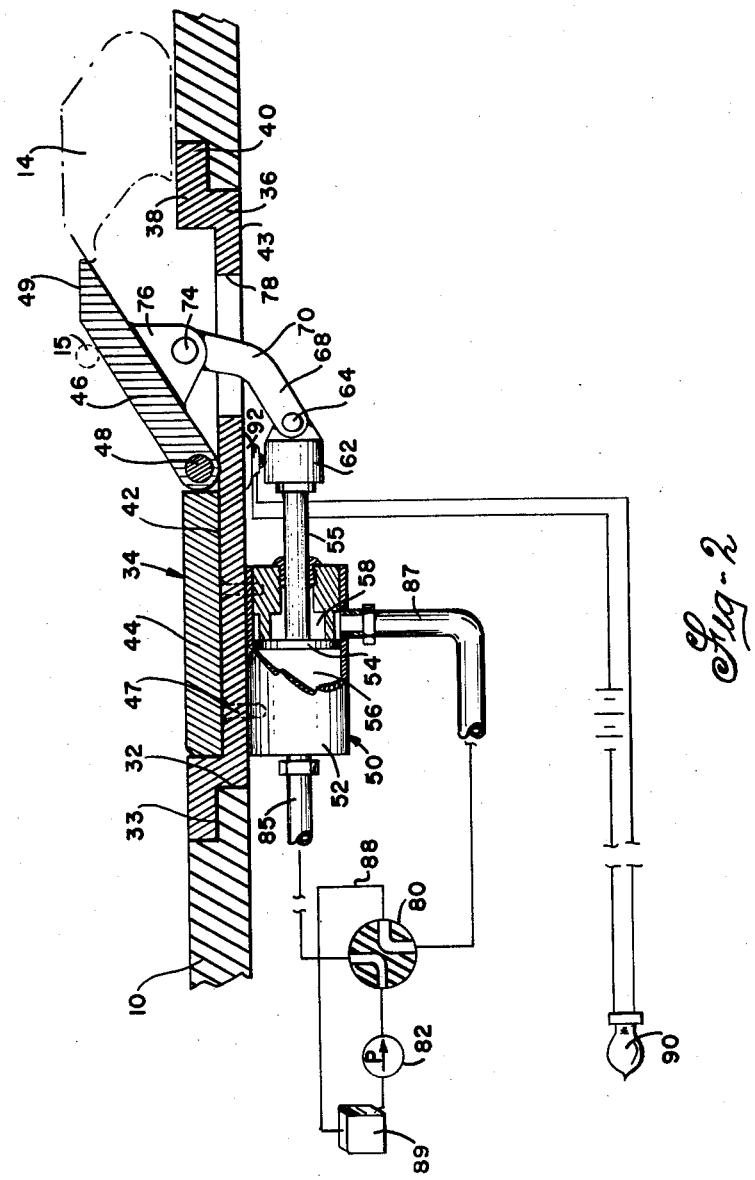

United States Patent Office 3,145,952
Patented Aug. 25, 1964

3,145,952
BRIDLE AND PENDANT ARRESTMENT
DEFLECTOR
Edward A. Ambrosano, Sr., Philadelphia, Pa., assignor to the United States of America as represented by the Secretary of the Navy
Filed June 7, 1963, Ser. No. 286,432
8 Claims. (Cl. 244—63)
(Granted under Title 35, U.S. Code (1952), sec. 266)

The invention described herein may be manufactured and used by or for the Government of the United States of America for government purposes without the payment of any royalties thereon or therefor.

This invention relates to aircraft launching equipment and particularly to the shuttle.

Aircraft launching catapults have a hook, that projects above the launch surface and is driven forward with firing of the catapult. The force of the catapult is applied to the aircraft to aid in its take-off through a tow cable or bridle that ties the aircraft to the shuttle hook. At the end of the take-off run or launch, the aircraft is airborne and the bridle is automatically disconnected from the aircraft and the shuttle hook. Both bridle and shuttle are then retracted in preparation of another launch.

Because separate engines of different speeds are used to retract the bridle and the shuttle, the bridle at times snags on the hook. Damage to equipment or injury to personnel has resulted.

It is an object of this invention to provide improvements which will avoid the adverted to condition. Specifically, the invention incorporates a deck ramp at the end of the shuttle track which can be raised or lowered propitiously in accordance to needs.

Various other objects will be apparent from the following description when read in light of the accompanying drawing.

In the drawing, which illustrates the preferred embodiment of the invention, and wherein similar reference numerals are used throughout the several views to designate corresponding parts, FIG. 1 is a perspective view showing a portion of a catapult equipped deck with an aircraft in broken lines, connected for a launch;

FIG. 2 is a sectional view along line 2—2 of FIG. 1 showing the invention with portions displayed schematically.

Referring to the drawing, FIG. 1, a portion of a launch surface 10, such as a carrier's deck, is shown having a longitudinal slot 12. A shuttle hook 14 projects through slot 12 that is inclined in a forwardly direction. A bridle 15 is looped at its center in engagement with shuttle hook 14 and its eye-like ends, 18, are joined to rearwardly directed hooks, 16, extending from an aircraft 20, which is about to be launched.

On each side of deck slot 12 running parallel with it, there is a bridle guide cable 22 and a sleeve or slider 26. Tie lines 24 connect the bridle 16 with the sliders 26. On the forward side of the sliders 26, one of the guide cables 22 passes through at eye, 28, on the end of a retract cable 30. The other end of the retract cable 30 is led over a pulley 31 secured to the deck 10 and passes below the deck where it is connected to a bridle arresting and retracting engine, not shown.

The shuttle hook 14 is moved forward in a launch, from right to left in FIG. 1, by power supplied from an engine, not shown and located below the deck. The sliders 26 move forward on the guide cables 22 and push the retract cable 30 ahead. When the aircraft reaches take-off speed, it pulls out of the bridle eyes 18 severing its connection with the deck. The bridle 15 is also disconnected from the shuttle hook 14 but retained on the deck by the tie lines 24.

After a launch, the arresting engines halt the shuttle hook 14 and bridle 15, the explanation of which is not deemed necessary for the purposes of this invention. The retract engines then tow the bridle and shuttle to the starting end of the deck slot for another launch.

To avoid snagging of the bridle 15 on the shuttle hook 14 during their retraction the deck 10 has a rectangularly-shaped cut-out 32 that is in line with and at the end of the deck slot 12 or launch track. The upper surface of the deck 10 is rabbeted around the edges of the cut-out 32 to provide a seat 33 for a deflector, generally indicated at 34, by which the bridle may be guided over the shuttle hook at the forward end of the launch track.

Deflector 34 has a plate-like housing 36 designed to fit within deck cut-out 32 that has an upstanding flange 38 with an outwardly directed flange 40 and is shaped to sit on the deck cut-out seat 33. The upper surface 42 of housing 36 when positioned is below the deck surface, while its under surface 43 is level with that of the deck, as shown in FIG. 2.

Supported on the housing 36 is a hinge-like member having a leaf 44 which is fixed, as by bolts or welds, not shown, to the forward end of the housing and a movable leaf or ramp 46 to which it is hinged by a pin 48 in a customary manner. The ramp leaf 46 can be raised to an upwardly and rearwardly directed incline that extends from the deck 10 to the top of the shuttle hook 14, covering its throat area as shown in FIG. 2. The forward edge of the ramp leaf 46 is chamfered, at 49, so that it may pass the shuttle hook 14 while being raised. The ramp leaf 46 rests over the shuttle hook, FIG. 2, and gets by the shuttle hook because of the normal play in the connections and because of the chamfer 49.

Movement of the ramp leaf 46 is achieved through an actuator 50 secured to the underside of housing 36 by bolts 47 or other suitable means, not shown. Actuator 50 has a cylinder 52 with a piston 54 that divides it into a ramp leaf extend chamber 56 and retract chamber 58. A rod 55 extends from piston 54 through the rearward end of cylinder 52 that is threaded into a nut 62. A pin 64 transversely passes through nut 62 and is pivotally secured to a bifurcated end 68 of a V-shaped actuator arm 70. The latter in turn is joined at its other end, which is also bifurcated, by a pin 74 to a lug 76 extending from the underside of ramp leaf 46. An appropriately positioned aperture 78 in housing 36 permits making the connection between actuator arm 70 and ramp leaf lug 76.

Piston 54 is reciprocably movable by fluid pressure applied to either of its ends. A four-way selector valve 80 is provided for alternately connecting a source of fluid pressure, pump 82 supplied from a reservoir 89, with a conduit 85 leading to extend chamber 56 of the actuator cylinder 52, or to a conduit 87 connected to the retract chamber 58 of the cylinder. A vent 88 is furnished to drain either of the actuator chambers, 56 or 58, through the selector valve 80 while fluid pressure is supplied to one of them. Thus, when the selector valve 80 is positioned as shown in FIG. 2, fluid pressure passes through the selector valve 80 and conduit 85 to the extend chamber 56; also, the retract chamber 58 is connected through the selector valve to the vent line 88. Similarly, turning the selector valve 80 in another direction, clockwise as viewed in FIG. 2, supplies the fluid pressure to the retract chamber 58 while the extend chamber 56 is vented.

The selector valve 80 is located at a remote point from the deflector 34. To indicate the position of the ramp leaf 46 a light 90 is placed near the selector valve 80 which is operated by a switch 92 secured to the underside of housing 36. Switch 92 is normally held open by a spring, not shown, and is closed by the piston rod nut 62 with its movement in raising the ramp leaf 46. Retraction of the ramp leaf 46, which takes place with movement of the piston rod 55 back into the actuator cylinder 52 allows the switch to open, break the light circuit, and cause lamp 90 to go out.

In the operation of the device, during the launch the deflector ramp leaf 46 is in the down position, as in FIG. 1. After the launch, the shuttle hook 14 is halted at the far end of the launch track near the deflector, as in FIG. 2. The bridle 15 is usually carried ahead of the deflector with the launched aircraft and is disconnected from the shuttle hook. Before returning the equipment for another launch, the ramp leaf 46 is raised, as in FIG. 2, by turning the selector valve 80 to admit fluid pressure into conduit 85. The nut 62 closes switch 92 and lamp 90 is illuminated, indicating that the ramp leaf 46 is in position. The retract engines, not shown, are then actuated to return the bridle and shuttle. The bridle is thereby drawn up the ramp leaf 46 and over shuttle hook 14, since the bridle retract engines are faster than the shuttle retract engine, are started sooner, and have been in operation until the bridle clears the shuttle before the latter's retract engine moves it away from the ramp.

After the shuttle hook 14 and bridle 15 are returned to the starting end of the launch track, the selector valve 80 is turned to admit fluid pressure into conduit 87; the fluid in the extend chamber 56 is vented through conduit 88. The return of piston rod 55 into cylinder 52 draws nut 62 away from switch 92 and allows it to open, causing the lamp 90 to go out.

While only one embodiment of the invention has been shown and described, others are contemplated and numerous changes and modifications may be made without departing from the essence of the invention as set forth in the appended claims.

What is claimed is:

1. In an aircraft launching surface having a launch track and a shuttle hook extending from said track above said surface, means for guiding a bridle over said hook comprising a ramp hingedly secured to said surface adapted to be raised at one end to the top of said hook while said hook is stationary adjacent said ramp and said bridle is retracted thereover.

2. The device of claim 1 including an actuator connected to said ramp for raising and lowering thereof.

3. The device of claim 2 including indicator means coupled to said ramp for indication of the position thereof.

4. In an aircraft launching surface having a launch track and a shuttle hook extending from said track above said surface, means for guiding a bridle over said shuttle hook comprising a ramp hingedly secured to said surface at the end of said track normally level with said surface and adapted to incline upward at one end from said surface to the top of said hook while said hook is stationary adjacent said ramp and said bridle is retracted thereover, a fluid pressure operated actuator secured to said surface and connected to said ramp movement thereof, and control means connected to said actuator for operation thereof at a distance from said ramp.

5. The device of claim 4 wherein said actuator has a cylinder and a piston with a rod extending therefrom through said cylinder, and a V-shaped arm pivotally connected at its ends to said ramp and said rod so that movement of said rod raises said ramp.

6. A device for deflecting a launching bridle over a shuttle hook for installation in a launch surface comprising a housing adapted to be mounted in said launch surface, a ramp hingedly secured at the top of said housing capable of being elevated at one end to an incline from said launch surface to the top of said shuttle hook while said hook is stationary adjacent said ramp and said bridle is retracted thereover, and actuator means secured to the underside of said housing connected to said ramp for movement thereof.

7. The device of claim 6 wherein said actuator comprises a cylinder secured to said housing, a piston in said cylinder, a rod joined to said piston and extending through said cylinder, and a V-shaped arm pivotally connected at its ends to said rod and the underside of said ramp.

8. The device of claim 7 including a pressure switch secured to said housing adapted to be actuated by said piston rod for operating an indicator light to signify the position of said ramp.

No references cited.